(12) United States Patent
Kami

(10) Patent No.: US 12,577,405 B2

(45) Date of Patent: Mar. 17, 2026

(54) ALUMINA POWDER AND METHOD OF PRODUCING THE SAME, AND STACK AND METHOD OF PRODUCING THE SAME

(71) Applicant: Hidetoshi Kami, Chiba (JP)

(72) Inventor: Hidetoshi Kami, Chiba (JP)

(73) Assignee: RICOH COMPANY, LTD., Tokyo (JP)

( * ) Notice: Subject to any disclaimer, the term of this patent is extended or adjusted under 35 U.S.C. 154(b) by 290 days.

(21) Appl. No.: 18/123,360

(22) Filed: Mar. 20, 2023

(65) Prior Publication Data

US 2023/0303849 A1 Sep. 28, 2023

(30) Foreign Application Priority Data

Mar. 23, 2022 (JP) ................................. 2022-046516

(51) Int. Cl.
C09D 1/00 (2006.01)
C01F 7/026 (2022.01)
(Continued)

(52) U.S. Cl.
CPC ............... C09D 1/00 (2013.01); C01F 7/026 (2013.01); C09D 5/002 (2013.01); C09D 5/021 (2013.01); C01P 2004/03 (2013.01); C01P 2004/51 (2013.01); C01P 2004/61 (2013.01); C01P 2004/62 (2013.01)

(58) Field of Classification Search
CPC ............................................. C01P 2004/51–53
See application file for complete search history.

(56) References Cited

U.S. PATENT DOCUMENTS

2019/0135648 A1* 5/2019 Hofius ................... C01F 7/023
2021/0003931 A1 1/2021 Kubo et al.
(Continued)

FOREIGN PATENT DOCUMENTS

JP 7-278415 10/1995
JP 2007-254826 10/2007
(Continued)

OTHER PUBLICATIONS

Machine translation JP2008-041627 (Year: 2025).*
(Continued)

*Primary Examiner* — Alexandre F Ferre

(74) *Attorney, Agent, or Firm* — XSENSUS LLP

(57) ABSTRACT

An alumina powder satisfying the following expressions is provided: (Expression 1) $0.7T_X \leq T_A \leq 1.3T_X$; (Expression 2) $0.7T_X \leq T_B \leq 1.3T_X$; and (Expression 3) $0.7T_X \leq T_C \leq 1.3T_X$, where $T_X$ represents a mean value of a peak height $T_A$ of a peak A in a particle size distribution of 0.3 μm or more to less than 1.2 μm, a peak height $T_B$ of a peak B in a particle size distribution of 0.7 μm or more to less than 3 μm, and a peak height $T_C$ of a peak C in a particle size distribution of 3 μm or more to less than 20 μm.

5 Claims, 6 Drawing Sheets

(51) Int. Cl.
   *C09D 5/00* (2006.01)
   *C09D 5/02* (2006.01)

(56) References Cited

U.S. PATENT DOCUMENTS

| | | | |
|---|---|---|---|
| 2022/0140284 A1 | 5/2022 | Kami et al. | |
| 2022/0342327 A1 | 10/2022 | Kami et al. | |

FOREIGN PATENT DOCUMENTS

| | | | | |
|---|---|---|---|---|
| JP | 2008041627 A | * | 2/2008 | |
| JP | 2008-056948 | | 3/2008 | |
| JP | 2010-237194 | | 10/2010 | |
| JP | 2012069806 A | * | 4/2012 | |
| JP | 2017-179421 | | 10/2017 | |
| JP | 2020-180346 | | 11/2020 | |
| JP | 2021-181393 | | 11/2021 | |
| WO | WO-2012002546 A1 | * | 1/2012 | ............ B32B 27/20 |
| WO | WO2017/199968 A1 | | 11/2017 | |
| WO | WO2018/194064 A1 | | 10/2018 | |

OTHER PUBLICATIONS

Machine translation JP2012-069806 (Year: 2025).*
Machine translation WO2012002546A1 (Year: 2025).*
U.S. Appl. No. 17/758,801, filed Dec. 25, 2020, Hidetoshi Kami, et al.
U.S. Appl. No. 17/906,259, filed Mar. 25, 2021, Tomoharu Asano, et al.
U.S. Appl. No. 18/075,435, filed Dec. 6, 2022, Hidetoshi Kami.

* cited by examiner

COMPARATIVE EXAMPLE

COMPARATIVE EXAMPLE

ALUMINA POWDER AND METHOD OF PRODUCING THE SAME, AND STACK AND METHOD OF PRODUCING THE SAME

CROSS-REFERENCE TO RELATED APPLICATIONS

This patent application is based on and claims priority pursuant to 35 U.S.C. § 119(a) to Japanese Patent Application No. 2022-046516, filed on Mar. 23, 2022, in the Japan Patent Office, the entire disclosure of which is hereby incorporated by reference herein.

BACKGROUND

Technical Field

The present disclosure relates to an alumina powder and a method of producing the same, and a stack and a method of producing the same.

Related Art

Aerosol deposition (hereinafter sometimes referred to as AD) has been known as a method of forming an alumina layer on the surface of a substrate. AD enables film formation from alumina in normal temperature, and thus has drawn expectation for application to provide a heat-labile substrate, such as a plastic film, with hard coating on the surface.

Conventionally, metal materials such as stainless steel and iron, and glass have been used typically as a substrate to be treated with alumina coating by AD. In recent years, however, several technological developments are underway for using a resin material as a substrate and forming alumina coating on the resin material.

Alumina coating onto a resin material (resin substrate) should have sufficient adhesiveness of alumina to the substrate.

An alumina coating film (hereinafter sometimes referred to as "alumina film" or "alumina layer") should further have not only adhesion of alumina to a substrate, but also toughness (strength (hardness) and ductility) in an alumina coating film (alumina bulk). In addition, a stack including an alumina film should have transparency.

SUMMARY

An alumina powder according to an embodiment of the present invention satisfies the following expressions:

$$0.7T_X \leq T_A \leq 1.3T_X; \qquad \text{(Expression 1)}$$

$$0.7T_X \leq T_B \leq 1.3T_X; \qquad \text{(Expression 2)}$$

and $$0.7T_X \leq T_C \leq 1.3T_X, \qquad \text{(Expression 3)}$$

where $T_X$ represents a mean value of a peak height $T_A$ of a peak A in a particle size distribution of 0.3 μm or more to less than 1.2 μm, a peak height $T_B$ of a peak B in a particle size distribution of 0.7 μm or more to less than 3 μm, and a peak height $T_C$ of a peak C in a particle size distribution of 3 μm or more to less than 20 μm.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1E:
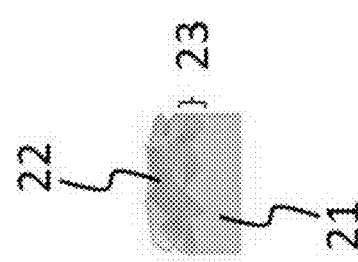
FIG. 1E is a conceptual diagram illustrating a phenomenon where a ceramic particle forms a film via AD (step 5)
Figure 1D:
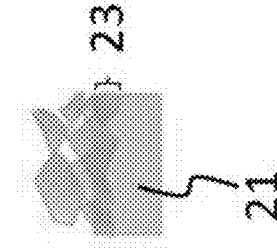
FIG. 1D is a conceptual diagram illustrating a phenomenon where a ceramic particle forms a film via AD (step 4)

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

According to embodiments of the present invention, an alumina powder that enables formation of a film with good hardness and transparency is provided.

(Alumina Powder)

The alumina powder according to the present embodiment satisfies the following expressions:

$$0.7T_X \leq T_A \leq 1.3T_X;$$ (Expression 1)

$$0.7T_X \leq T_B \leq 1.3T_X; \text{ and}$$ (Expression 2)

$$0.7T_X \leq T_C \leq 1.3T_X.$$ (Expression 3)

where $T_X$ represents a mean value of a peak height $T_A$ of a peak A in a particle size distribution of 0.3 μm or more to less than 1.2 μm, a peak height $T_B$ of a peak B in a particle size distribution of 0.7 μm or more to less than 3 μm, and a peak height $T_C$ of a peak C in a particle size distribution of 3 μm or more to less than 20 μm.

Conventional technologies have still had unsolved problems of how to improve adhesiveness between a substrate and an alumina film, and toughness of an alumina film, and also how to reduce whitening of a stack due to film formation of an alumina film, in application of an alumina coating technology for a resin material to an industrial product.

Toughening of a metal oxide layer produced by AD varies depending on a powdered material to be used for film formation, a substrate, and a film formation condition, and thus no condition can be determined primarily. Accordingly, in regard to film formation conditions for providing a metal oxide layer having toughness, an optimum condition should be found for each material to be used for film formation.

Additionally, when a stack, which is an end product, should have transparency, the stack should be prevented from whitening.

FIG. 1A to FIG. 1E are a series of conceptual diagrams simply illustrating a phenomenon where a ceramic particle 11 forms a film via AD.

A mechanism of ceramic coating by AD can be illustrated as below with use of FIG. 1A to FIG. 1E. Specifically, the ceramic particle 11 is sprayed ("spraying step") to a substrate 21 by AD, and generate a crack 12 due to collision and impact ("impact step") (see FIG. 1A and FIG. 1B).

Figure 1C:
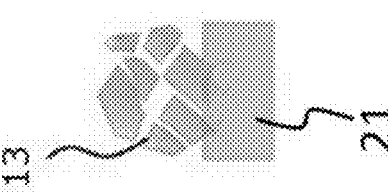
FIG. 1C is a conceptual diagram illustrating a phenomenon where a ceramic particle forms a film via AD (step 3)
Figure 1B:
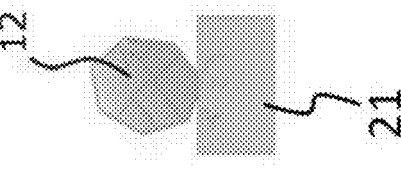
FIG. 1B is a conceptual diagram illustrating a phenomenon where a ceramic particle forms a film via AD (step 2).

Then, the particle is finely crushed ("crushing step") to generate an active nascent face 13 on a fracture surface of the crushed ceramic particle 11 (see FIG. 1C). Fine crystal fragments each having such nascent face 13 move or rotate on the substrate by inertia moment and collision pressure, and thereby increase in density ("densification step") (see FIG. 1D), leading to rejoining of nascent faces to one another and condensation ("consolidation step") (see FIG. 1E).

It can be understood that a ceramic film is formed by a sequential state change in order of FIG. 1A to FIG. 1E. However, in actual fact, the states depicted in FIG. 1A to FIG. 1E are presumed to be present as a mixture. Ceramic coating can be estimated to exhibit various appearances corresponding to probabilities of these states.

Figure 1A:
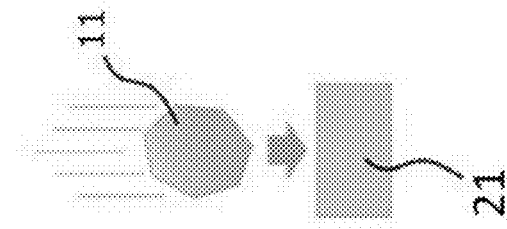
FIG. 1A is a conceptual diagram illustrating a phenomenon where a ceramic particle forms a film via AD (step 1)

With reference to FIG. 1A, a focus will be provided on erosion of the ceramic particle 11 on the surface of the substrate at a step of spraying. Provided that a state of the ceramic particle 11 colliding to the substrate is not greatly different from a state by sand blast, erosion progresses on the surface of the substrate. The particle diameter of the ceramic particle 11 to be included in raw material powder is presumed to define progression level of erosion, as can be seen in sand blast, which provides various impact corresponding to a media size.

When a substrate to be treated with ceramic coating is a fragile organic material unlike glass and metal, measures against such erosion have a particular priority.

Meanwhile, when ceramic coating is intended for toughening the surface of a substrate, adhesion of raw material powder onto the surface of a substrate alone wvill not be enough to have meaning of application.

Accordingly, measures should be taken to concurrently achieve erosion of a substrate in ceramic coating by AD, and formation of a tough metal oxide surface.

The alumina powder according to the present embodiment was earnestly investigated for conditions that concurrently achieves erosion of a substrate in ceramic coating, and formation of a tough metal oxide surface.

Meeting the conditions in the present embodiment not only results in formation of a surface layer having pencil hardness different from that of a layer produced by AD, where pressed powder is only adhered onto the surface of a substrate, but also provides an effect having good film formation efficiency for ceramic coating.

(1) Particles having a particle size distribution of 0.3 μm or more to less than 1.2 μm contributes to thickening of an alumina layer (film), and (2) addition of particles having a particle size distribution of 0.7 μm or more to less than 3 μm causes the alumina particles to easily dig into a substrate. This causes formation of an alumina wedge (anchor) between an alumina layer (film) produced on the surface and a substrate, and consequently, enables prevention of release of the alumina layer (film). (3) Particles having a particle size distribution of 3 μm or more to less than 20 μm are presumed to act on toughening of an alumina film.

The inventors of the present invention earnestly investigated powdered materials, substrates, and film formation conditions, in regard to a technology that provides more room for an optimal condition enabling use of AD, and consequently found alumina powder that has a plurality of specific particle size distributions and contains powder having separate particle size distributions at a particular amount ratio.

First, description will be made for particle size distributions of the alumina particles according to the present embodiment.

The alumina powder according to the present embodiment has a peak A in a particle size distribution of 0.3 μm or more to less than 1.2 μm, a peak B in a particle size distribution of 0.7 μm or more to less than 3 μm, and a peak C in a particle size distribution of 3 μm or more to less than 20 μm.

Identification of a peak in a particle size distribution may be made by methods of: (1) viewing a particle diameter value in polarity reversion for numerical differentiation of particle size distribution data, as a peak value, (2) reading a peak value output from analysis software associated with a particle size distribution measuring instrument, (3) using a peak detection functionality integrated in numerical value analysis software, (4) and identifying a peak value from observation of a waveform image.

Figure 2A:
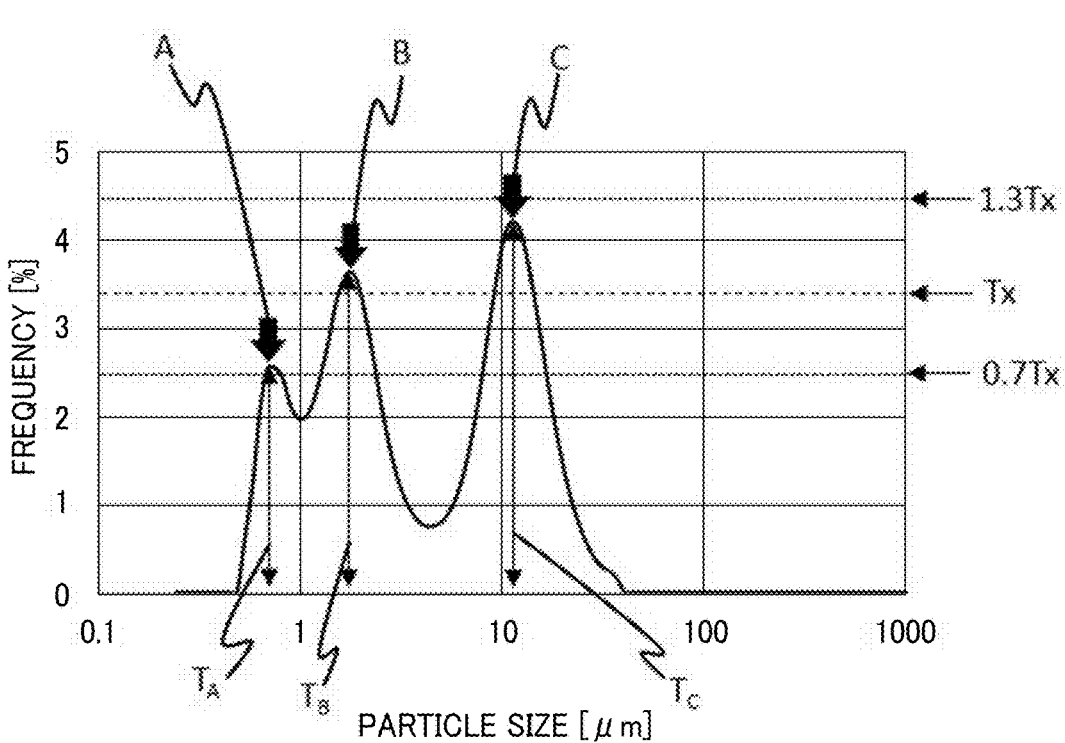
FIG. 2A is a graph illustrating a particle size distribution of an alumina powder according to an embodiment of the present invention in Examples 1 to 3.
Figure 2B:
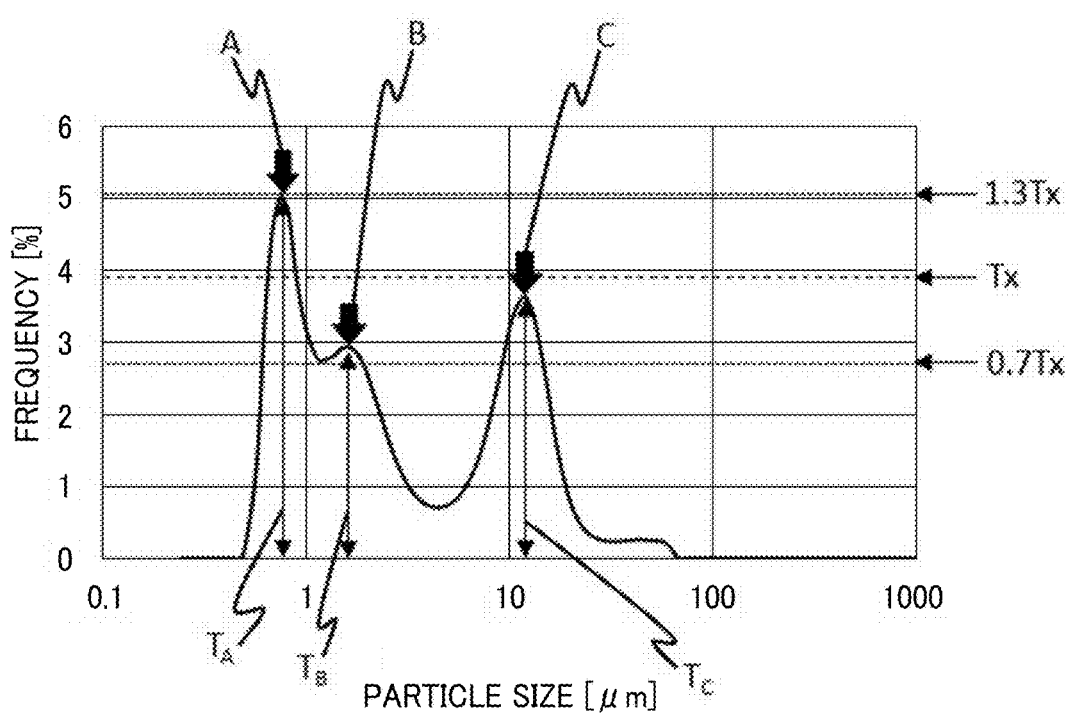
FIG. 2B is a graph illustrating a particle size distribution of an alumina powder according to an embodiment of the present invention in Examples 4 to 5.
Figure 2C:
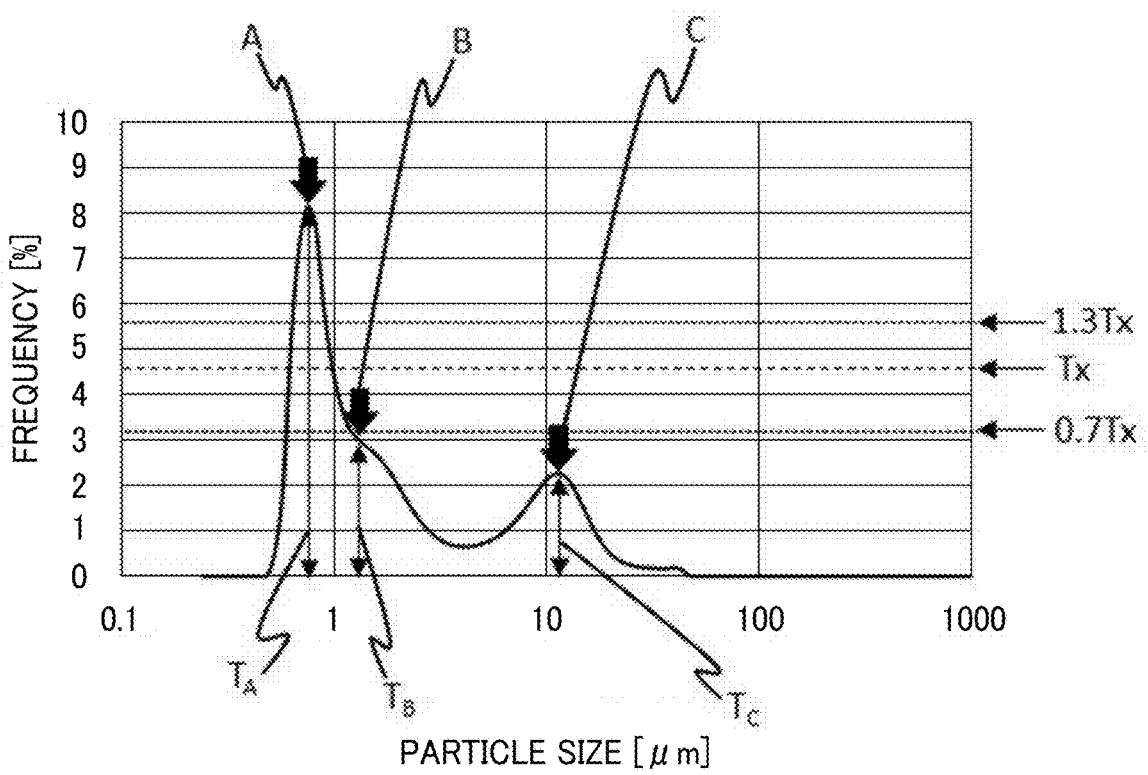
FIG. 2C is a graph illustrating a particle size distribution of another alumina powder in Comparative Example 1.

For example, in identification of a peak included in a shoulder as seen in a waveform depicted in FIG. 2C, use of peak separation software allows identification of the peak.

Examples of the numerical value analysis software include, but are not limited to, MATLAB available from The MathWorks, Inc.

Examples of the peak separation software include, but are not limited to, ORIGINPRO available from LightStone Corp.

A particle size distribution of the alumina particles according to the present embodiment can be measured with the following conditions.

[Measurement Conditions of Particle Size Distribution]

Particle size distribution measurement device with a laser diffraction/scattering system: MT3300EX II (manufactured by MicrotracBEL Corp.)

Measurement system: dry

Pressure of pressure air used for dispersion of a sample in measurement: 0.15 MPa Temperature/humidity environment in measurement: 23±1° C. 50±3% RH Hereinafter, the alumina powder according to the present embodiment will be described in detail with reference to the drawings. FIG. 2A is a graph illustrating a particle size distribution of the alumina powder according to the present embodiment measured under the conditions described above.

As depicted in FIG. 2A, the alumina particles according to the present embodiment have a particle size distribution including a peak A in the range of a particle size of 0.3 μm or more to less than 1.2 μm ("A" in FIG. 2A), a peak B in the range of a particle size of 0.7 μm or more to less than 3 μm ("B" in FIG. 2A), and a peak C in the range of a particle size of 3 μm or more to less than 20 μm ("C" in FIG. 2A).

The height of the peak A is defined as $T_A$ (%); the height of the peak B is defined as $T_B$ (%); the height of the peak C is defined as $T_C$ (%), and then the mean value of the $T_A$ (%), the $T_B$ (%), and the $T_C$ (%) is defined as $T_X$ (%). Here, the $T_A$ (%), the $T_B$ (%), and the $T_C$ (%) satisfy the following Expression 1 to Expression 3:

$$0.7T_X \leq T_A \leq 1.3T_X; \quad \text{(Expression 1)}$$

$$0.7T_X \leq T_B \leq 1.3T_X; \text{ and} \quad \text{(Expression 2)}$$

$$0.7T_X \leq T_C \leq 1.3T_X. \quad \text{(Expression 3)}$$

In other words, the $T_A$ (%), the $T_B$ (%), and the $T_C$ (%) in FIG. 2A each fall in the range of $0.7T_X$ or more to $1.3T_X$ or less.

"Particle size at each peak" and "numerical value of each symbol" in FIG. 2A are as follows:

particle size of peak A: 0.69 μm;
particle size of peak B: 1.6 μm;
particle size of peak C: 11 μm;
height of peak A, $T_A$ (%): 2.6%;
height of peak B, $T_B$ (%): 3.6%;
height of peak C, $T_C$ (%): 4.2%;
mean value of all peak heights, $T_X$ (%): 3.5%;
$1.3T_X$ (%): 4.55%; and
$0.7T_X$ (%): 2.45%.

The shape of the alumina powder according to the present embodiment is not particularly limited, and can be appropriately selected corresponding to a purpose, and examples thereof include, but are not limited to, a spherical form, a plate form, and an amorphous form.

The structure of the alumina powder according to the present embodiment is not particularly limited, and can be appropriately selected corresponding to a purpose, and examples thereof include, but are not limited to, α, γ, and θ.

The alumina powder according to the present embodiment preferably contains α-alumina having a crystal structure represented by a hexagonal closest packing structure. Inclusion of the α-alumina having a crystal structure represented by a hexagonal closest packing structure provides improved pencil hardness.

The content of the α-alumina is preferably 34% by mass or more, and more preferably 90% by mass or more to 99.5% by mass or less.

In the alumina powder according to the present embodiment, the content of particles having a particle size distribution of 0.3 μm or more to less than 1.2 μm exhibits (Expression 1) $0.7T_X \leq T_A \leq 1.3T_X$, and further, preferably satisfies a relation of $T_A \leq T_B$, and more preferably satisfies a relation of $T_A \leq T_B \leq T_C$.

In such alumina powder, when the content of particles having a particle size distribution of 0.3 μm or more to less than 1.2 μm falls in the aforementioned range, both total light transmittance and pencil hardness can be improved together.

Moreover, in the alumina powder according to the present embodiment, the content of particles having a particle size distribution of 0.7 μm or more to less than 3 μm exhibits (Expression 2) $0.7T_X \leq T_A \leq 1.3T_X$, and further, preferably satisfies a relation of $T_A \leq T_B$, and more preferably satisfies a relation of $T_A \leq T_B \leq T_C$.

In such alumina powder, when the content of particles having a particle size distribution of 0.7 μm or more to less than 3 μm falls in the aforementioned range, both total light transmittance and pencil hardness can be improved together.

Furthermore, in the alumina powder according to the present embodiment, the content of particles having a particle size distribution of 3 μm or more to less than 20 μm exhibits (Expression 3) $0.7T_X \leq T_A \leq 1.3T_X$, and further, preferably satisfies a relation of $T_A \leq T_B$, and more preferably satisfies a relation of $T_A \leq T_B \leq T_C$.

In such alumina powder, when the content of particles having a particle size distribution of 3 μm or more to less than 20 μm falls in the aforementioned range, both total light transmittance and pencil hardness can be improved together.

The alumina powder according to the present embodiment further includes an other component as appropriate.

—Other Component—

The other component is not particularly limited, and can be appropriately selected corresponding to a purpose, and examples thereof include, but are not limited to, fluidizers and anticaking agents.

The content of the other component is not particularly limited if not leads to inhibition of an effect of the alumina powder according to the present embodiment, and can be appropriately selected corresponding to a purpose.

The alumina powder is produced by a production method of alumina powder described later.

(Production Method of Alumina Powder)

The production method of alumina powder in the present embodiment is a production method of the alumina powder according to the present embodiment, includes a dispersion process, and further includes an other process as appropriate.

<Dispersion Process>

The dispersion process is a process that performs dry dispersion of first alumina particles having a volume mean particle diameter of 0.5 μm or more to 0.9 μm or less and second alumina particles having a volume mean particle diameter of 10 μm or more to 20 μm or less.

Examples of the dry dispersion include, but are not limited to, a treatment that performs dispersion under the following conditions.

<Conditions>

Dry disperser

Dispersion medium: PSZ (partially stabilized zirconia) ball (manufactured by Nikkato Corporation, 3 mm in diameter)

Filling content of a dispersion medium: 2.5 kg

Circumferential velocity: 4±2 m/s

Feed (supply): 1±0.5 kg/h

Opening: 1.5±0.5 mm

7

Dispersion auxiliary: 100% ethanol (1±1% by mass relative to total dispersion mass)

Dispersion time: 60±30 minutes

Examples of the dry disperser include, but are not limited to, the trade name of DRYSTER SDA1 (manufactured by Ashizawa Finetech Ltd.).

A dispersion medium for the dry dispersion is not particularly limited, and can be appropriately selected corresponding to a purpose, and examples thereof include, but are not limited to, a YTZ ball, a PSZ ball, an alumina ball, and an agate ball. Examples of commercially available products of the dispersion medium include, but are not limited to, the trade name of PSZ (partial stabilized zirconia) ball (manufactured by Nikkato Corporation, 3 mm in diameter).

The filling content of a dispersion medium in the dry dispersion is not particularly limited, but is preferably 70 vol %±15 vol % of a disperser vessel volume.

The inventors of the present invention found that subjecting the first alumina particles and the second alumina particles to the dry dispersion under the aforementioned conditions can provide alumina particles that meet the following conditions.

<Alumina Powder>

When a mean value of peak heights in a peak A in a particle size distribution of 0.3 μm or more to less than 1.2 μm, a peak B in a particle size distribution of 0.7 μm or more to less than 3 μm, and a peak C in a particle size distribution of 3 μm or more to less than 20 μm is defined as $T_X$, a peak height $T_A$ of the peak A, a peak height $T_B$ of the peak B, and a peak height $T_C$ of the peak C satisfy the following expressions:

$$0.7T_X \leq T_A \leq 1.3T_X; \tag{1}$$

$$0.7T_X \leq T_B \leq 1.3T_X; \text{ and} \tag{2}$$

$$0.7T_X \leq T_C \leq 1.3T_X, \tag{3}$$

The particle size distribution can be measured under the conditions as follows.

[Measurement Conditions of Particle Size Distribution]

Particle size distribution measurement device with a laser diffraction/scattering system: MT3300EX II (manufactured by MicrotracBEL Corp.)

Measurement system: dry

Pressure of pressure air used for dispersion of a sample in measurement: 0.15 MPa Temperature/humidity environment in measurement: 23±1° C., 50±3% RH <Other Process>

The other process is not particularly limited, and can be appropriately selected corresponding to a purpose.

(Stack)

Embodiments of the present invention provide stacks according to the first and second aspects as below.

[First Aspect]

A stack according to a first aspect of the present invention includes a substrate and an alumina layer, and further includes another layer as appropriate.

In the stack according to the first aspect, in a cross-sectional view perpendicular to a planar view of the substrate, a surface of the aluminum layer which faces the substrate has an arithmetic mean roughness Ra, as represented by the following Formula 1, of 0.08 μm or more to 0.20 μm or less:

8

$$Ra = \frac{1}{L} \int_0^L |f(x)| dx \tag{Formula 1}$$

where in Formula 1, L represents a whole measurement length and is 8 μm or more to 16 μm or less, x represents a measurement position, and f(x) represents a function of a measurement waveform.

<Substrate>

The substrate is not particularly limited if usable as a substrate, and can be appropriately selected corresponding to a purpose.

Examples of a material of the substrate include, but are not limited to, organic materials and inorganic materials.

The organic materials are not particularly limited, and can be appropriately selected corresponding to a purpose, and examples thereof include, but are not limited to, substrates with flexibility and substrates with plasticity.

Examples of the organic materials include, but are not limited to, polyethylene terephthalate (PET), polyethylene naphthalate (PEN), polyimide, polyacrylate, polymethyl methacrylate, polycarbonate, polyamide, polyimide, polyester, polycyclic olefin polymer (COP), thermoplastic polyurethane, and tri-acetyl cellulose (TAC). These may be used alone or in combination of two or more kinds.

The shape of the substrate is not particularly limited, and can be appropriately selected corresponding to a purpose, and examples thereof include, but are not limited to, a sheet form, a film form, and a block form. These may be used alone or in combination of two or more kinds.

The structure of the substrate is not particularly limited, and can be appropriately selected corresponding to a purpose, and examples thereof include, but are not limited to, a monolayer sheet, a multi-layer body stacked with a plurality of monolayer sheets.

The structure and size of the substrate are not particularly limited, and can be appropriately selected corresponding to a purpose.

The mean thickness of the substrate is preferably 10 μm or more to 2000 μm or less, and more preferably 75 μm or more to 200 μm or less.

<Alumina Layer>

The alumina layer is a layer containing the alumina powder according to the present embodiment.

The shape, structure, and size of the alumina layer are not particularly limited, and can be appropriately selected corresponding to a purpose.

In the stack according to the first aspect, in a cross-sectional view perpendicular to a planar view of the substrate, a surface of the alumina layer which faces the substrate has an arithmetic mean roughness Ra, as represented by the following Formula 1, of 0.08 μm or more to 0.20 μm or less:

$$Ra = \frac{1}{L} \int_0^L |f(x)| dx \tag{Formula 1}$$

where in Formula 1, L represents a whole measurement length and is 8 μm or more to 16 μm or less, x represents a measurement position, and f(x) represents a function of a measurement waveform.

More detailed description will be made with reference to the drawings.

Figures 3, 4:
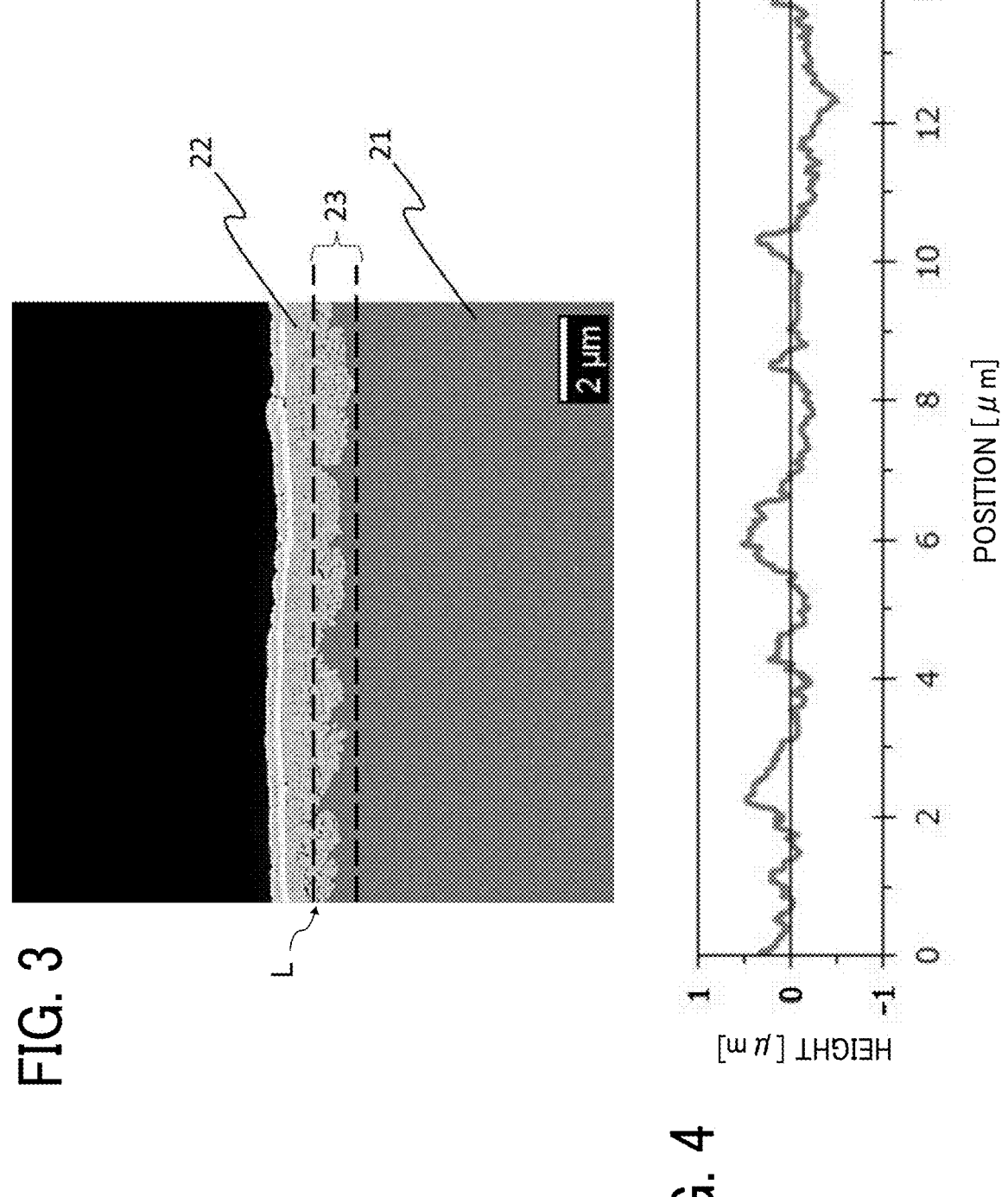
FIG. 3 is a scanning electron microscopic image depicting a cross-section of a stack according to an embodiment of the present invention.
FIG. 4 is graph illustrating a profile of a boundary line between an alumina layer and another layer in the stack according to an embodiment of the present invention.

FIG. 3 is a cross-sectional view perpendicular to a planar view of the substrate in the stack according to the present embodiment.

As depicted in FIG. 3, the stack according to the present embodiment includes the substrate 21, an alumina layer 22, and an anchor region 23.

The stack according to the present embodiment is produced by spraying the alumina powder according to the present embodiment to the substrate 11 by AD, and the alumina powder thus digs into the surface of the substrate 21 and is embedded therein. On the embedded alumina powder, alumina particles further collide, crush, undergo densification, and consolidate, thereby forming an integrated film-shape alumina layer.

The anchor region 23 includes a part of alumina particles embedded into the surface of the substrate 21 in a production process of the stack. Such a region having a complicated mixture of a substrate and alumina powder is referred to as an anchor region in the present embodiment.

In this manner, the stack according to the present embodiment has an anchor region, thereby making an alumina layer less likely to release from a substrate, and providing an alumina layer (film) with good ductility and adhesiveness.

<Anchor Region>

The anchor region described above can be linked to manufacturing of products, by defining the level of unevenness of a boundary line (interface) between the substrate and the alumina layer.

The anchor region means a region having unevenness in the alumina layer, and refers to a region measured and defined by the following method.

First, a stack including an alumina layer directly or via an intermediate layer described later on the substrate is subject to focused ion beam (FIB) processing in a direction perpendicular to a planar view of the substrate, thereby obtaining a cross-sectional sample for electron microscopy that enables observation of a layer structure of the stack as depicted in FIG. 3.

Depending on a material or a purpose, exposure of a cross-section of the sample can be made using a microtome, a cross-section polisher, or another tool.

The level of unevenness of a boundary line (interface) between the substrate and the alumina layer is measured and calculated by observing the cross-sectional sample.

Ultra-low-accelerated field emission scanning electron microscope (device name: Gemini SEM 300, manufactured by Carl Zeiss Co., Ltd.) is used to take image data, such as a SEM image or a STEM image, of the observation sample under a condition of an acceleration voltage of 2 kV or less.

The alumina layer and a boundary line between the alumina layer and the substrate can be defined by image analysis of a SEM image, a SEM-EDS image, or another image by use of an ultra-low-accelerated field emission scanning electron microscope.

In use of a SEM image, the boundary line is detected from difference in contrast of the image thus obtained.

Meanwhile, in use of a SEM-EDS image, a microscope mounted with an EDS detector (device name: Gemini SEM 300, manufactured by Carl Zeiss Co., Ltd.) is used. In addition, irradiation energy of an electron beam in acquisition of a SEM image is $3.0 \times 10^{-7}$ J/S. EDS measurement is performed with electron beam irradiation energy identical to that in the SEM image thus obtained, thereby providing an image color-coded for an alumina-originated element (e.g., aluminum), a substrate-originated element (e.g., carbon), and other elements (hereinafter referred to as a SEM-EDS image).

In this image data, for the purpose of emphasizing the level of unevenness of a boundary line (interface) between the substrate and the alumina layer, binarization of the image data or extraction of an edge is performed to highlight the boundary line, followed by digitization of the contour as a two-dimensional numerical value data.

Digitization from the image data to the numerical value data of the boundary line is performed by image analysis software. Examples of the image analysis software include, but are not limited to, ImageJ (NIH) and Image-Pro Plus (Media cybernetics, Inc.).

In the stack according to the present embodiment, such boundary line (the level of unevenness) is deemed as a mean roughness of a surface of the alumina layer which faces the substrate, to represent one of characteristics of the anchor region. That is, in the stack according to the present embodiment, evaluation as an unevenness profile of the anchor region of the alumina layer allows designing of a stack having a desired unevenness profile.

In the present embodiment, the mean roughness is calculated, as a common parameter, by a calculation formula of an arithmetic mean roughness (Ra) represented by Formula 1 as follows:

$$Ra = \frac{1}{L} \int_0^L |f(x)| dx \qquad \text{Formula 1}$$

where in Formula 1, L represents a whole measurement length and is 8 μm or more to 16 μm or less, x represents a measurement position, and f(x) represents a function of a measurement waveform.

In the Formula 1, a function of a measurement waveform represented by f(x) can be derived by defining a contour extracted by the image analysis software as a measurement waveform, and outputting the function from the image analysis software based on the measurement waveform.

In the Formula 1, a whole measurement length L means a whole length of a measurement length for measuring the arithmetic mean roughness Ra in a cross-sectional view perpendicular a planar view of the substrate of the stack according to the present embodiment (also referred to as a base length). For example, in terms of FIG. 4, roughness is measured at a position (μm) from 0 μm to 14 μm in FIG. 4, and the whole measurement length L in this case is thus 14 μm.

The arithmetic mean roughness Ra represented by the Formula 1 is 0.08 μm or more to 0.20 μm or less, preferably 0.10 μm or more to 0.18 μm or less, and more preferably 0.12 μm or more to 0.16 μm or less.

When the arithmetic mean roughness Ra represented by the Formula 1 is 0.08 μm or more, the following phenomenon is prevented: Ra is too small to cause the anchor region to be narrowed down to an alumina layer side, thereby allowing release of the alumina layer from a substrate. Meanwhile, when the arithmetic mean roughness Ra represented by the Formula 1 is 0.20 μm or less, the following phenomenon is prevented when forming an alumina layer into a thin film: Ra is too large to cause the alumina layer to be discontinuous, thereby allowing reduction in scratch resistance. Thus, when the arithmetic mean roughness Ra is 0.08 μm or more to 0.20 μm or less, the alumina layer can have good strength.

FIG. 4 is a diagram illustrating a scatter plot of numerical value data derived by digitizing a boundary line between the substrate and the alumina layer for image data in FIG. 3. The arithmetic mean roughness Ra calculated from the curve is 0.16 μm.

The content of the alumina powder according to the present embodiment in the alumina layer is preferably 90%/o by mass or more to 100% by mass or less, more preferably 95% by mass or more to 100% by mass or less, and even more preferably 98% by mass or more to 100% by mass or less.

The mean thickness of the alumina layer is preferably 0.1 μm or more to 30 μm or less, and more preferably 0.3 μm or more to 3 μm or less. When the mean thickness of the alumina layer is 0.3 μm or more to 3 μm or less, the alumina layer (film) can be improved in hardness and transparency.

An example method of measuring the mean thickness of the alumina layer is performed by preparing an aluminum tube having a diameter of φ100 mm and a length of 380 mm as a support, winding the stack according to the present embodiment along a curved surface of the aluminum tube, and measuring thicknesses at five sites located at 100 mm to 300 mm from the end part at an interval of 50 mm in a longitudinal direction of the aluminum tube. With changing measurement positions, measurement is performed at five sites 20 times in total, to provide thickness data for 100 points in total. The measurement of thicknesses is performed by a method that employs light coherency in accordance with Japanese Patent No. 5521607. From the mean value of the obtained data, a thickness is derived in conjunction with a standard deviation.

Meanwhile, as another method, measurement of the mean thickness of the alumina layer is performed by measuring specifically a thickness of a region in the alumina layer other than an unevenness part (anchor region), in a cross-sectional view perpendicular to a planar view of the substrate. The mean thickness of the alumina layer is derived by setting a straight line L that has contact with but not intersects a boundary line and is parallel to a straight line in the bottom face of the substrate, in a cross-sectional view perpendicular to a planar view of the substrate; and performing 10-point measurement for a distance from the straight line L to the outermost surface of the alumina layer in a direction perpendicular to the straight line L at any 10 points on the straight line L (see e.g., FIG. 3).

[Second Aspect]

A stack according to a second aspect of the present invention includes a substrate, an alumina layer, an intermediate layer between the substrate and the alumina layer, and an anchor region between the alumina layer and the intermediate layer, in which the alumina layer and the intermediate layer are mixed, and further includes another layer as appropriate.

<Substrate>

The substrate is similar to that in the first aspect.

<Alumina Layer>

The alumina layer is similar to that in the first aspect.

<Intermediate Layer>

The intermediate layer is a layer disposed between the substrate and the alumina layer.

Inclusion of the intermediate layer allows placement of the alumina layer without contact of alumina powder with the substrate, thus enabling avoiding damage of the surface of the substrate and preventing whitening of the substrate. Since the substrate can be prevented from whitening, a stack having transparency can be provided.

The intermediate layer has preferably H or harder and more preferably 2H or harder in pencil hardness not causing "cohesion failure", among the criteria of "cohesion failure"

and "plastic deformation" in regard to pencil hardness measured in accordance with JIS K 5600-5-4:1999. When the intermediate layer has 2H or harder in pencil hardness not causing cohesion failure, in regard to pencil hardness measured in accordance with JIS K 5600-54:1999, the surface of the substrate can avoid from damage, thus providing a stack with transparency.

The shape, structure, and size of the intermediate layer are not particularly limited, and can be appropriately selected corresponding to a purpose.

A material of the intermediate layer is not particularly limited, and examples thereof include, but are not limited to, organic materials and organic-inorganic hybrid materials.

Examples of the organic materials include, but are not limited to, urethane resins.

Examples of the organic-inorganic hybrid materials include, but are not limited to, a mixture of silsesquioxane and a urethane resin.

As the intermediate layer, a synthesized one or a commercially available one may be used.

The commercially available one is not particularly limited, and can be appropriately selected corresponding to a purpose, and examples thereof include, but are not limited to, COMPOCELAN SQ series (manufactured by Arakawa Chemical Industries, Ltd.).

The mean thickness of the intermediate layer is preferably 1 μm or more to 100 μm or less, and more preferably 20 μm or more to 60 μm or less. When the mean thickness of the intermediate layer is 20 μm or more to 60 μm or less, adhesive strength between the intermediate layer and the substrate and apparent pencil hardness can be improved.

In the stack according to the present embodiment, the level of unevenness of a boundary line (interface) between the intermediate layer and the alumina layer, that means, a boundary line (interface) between the intermediate layer and the alumina layer and an arithmetic mean roughness Ra thereof in a cross-sectional view perpendicular to a planar view of the substrate, can be detected and calculated by a method similar to that in the first aspect. In addition, when a SEM-EDS image is used in detection of the intermediate layer, carbon or another element is detected as an element derived from the intermediate layer.

Examples of a method of disposing the intermediate layer include, but are not limited to, a method that provides an intermediate layer-forming material before disposing the alumina layer on the substrate.

The method of applying the intermediate layer-forming material to the substrate is not particularly limited, and can be appropriately selected corresponding to a purpose, and examples thereof include, but are not limited to, a roller, curtain coating, and ink-jetting.

<Anchor Region>

The anchor region is a region between the alumina layer and the intermediate layer, in which the alumina layer and the intermediate layer are mixed.

The anchor region is the same as that in the first aspect, except for changing the substrate to the intermediate layer, as a layer to be a ground dug by the alumina layer, in the first aspect.

The stack according to the present embodiment can be specifically, suitably applied to, e.g., a display, a support for a solar cell, and a protection film.

(Production Method of Stack)

A production method of the stack according to the present embodiment includes a powder spraying process that sprays alumina powder from a nozzle to a substrate, and as appropriate, further includes an other process.

<Powder Spraying Process>

The powder spraying process is a process that sprays alumina powder from a nozzle to a substrate.

—Alumina Powder—

The alumina powder satisfies the following expressions:

$$0.7T_X \leq T_A \leq 1.3T_X; \tag{1}$$

$$0.7T_X \leq T_B \leq 1.3T_X; \text{ and} \tag{2}$$

$$0.7T_X \leq T_C \leq 1.3T_X, \tag{3}$$

where $T_X$ represents a mean value of a peak height $T_A$ of a peak A in a particle size distribution of 0.3 μm or more to less than 1.2 μm, a peak height $T_B$ of a peak B in a particle size distribution of 0.7 μm or more to less than 3 μm, and a peak height $T_C$ of a peak C in a particle size distribution of 3 μm or more to less than 20 μm.

The alumina powder described above is similar to the alumina powder according to the present embodiment.

Examples of a method of spraying the alumina powder from a nozzle to the substrate include, but are not limited to, aerosol deposition.

[Aerosol Deposition (AD)]

The aerosol deposition (AD) method is a technique for forming a film by mixing pre-prepared fine particles or ultrafine particles with a gas to form an aerosol and spraying the aerosol to a film-forming target (substrate) through a nozzle.

The AD method has characteristics that enable formation of a film in a normal temperature environment while approximately maintaining the crystal structures of raw materials.

One method for forming an alumina layer by the aerosol deposition will now be described below.

Figure 6:
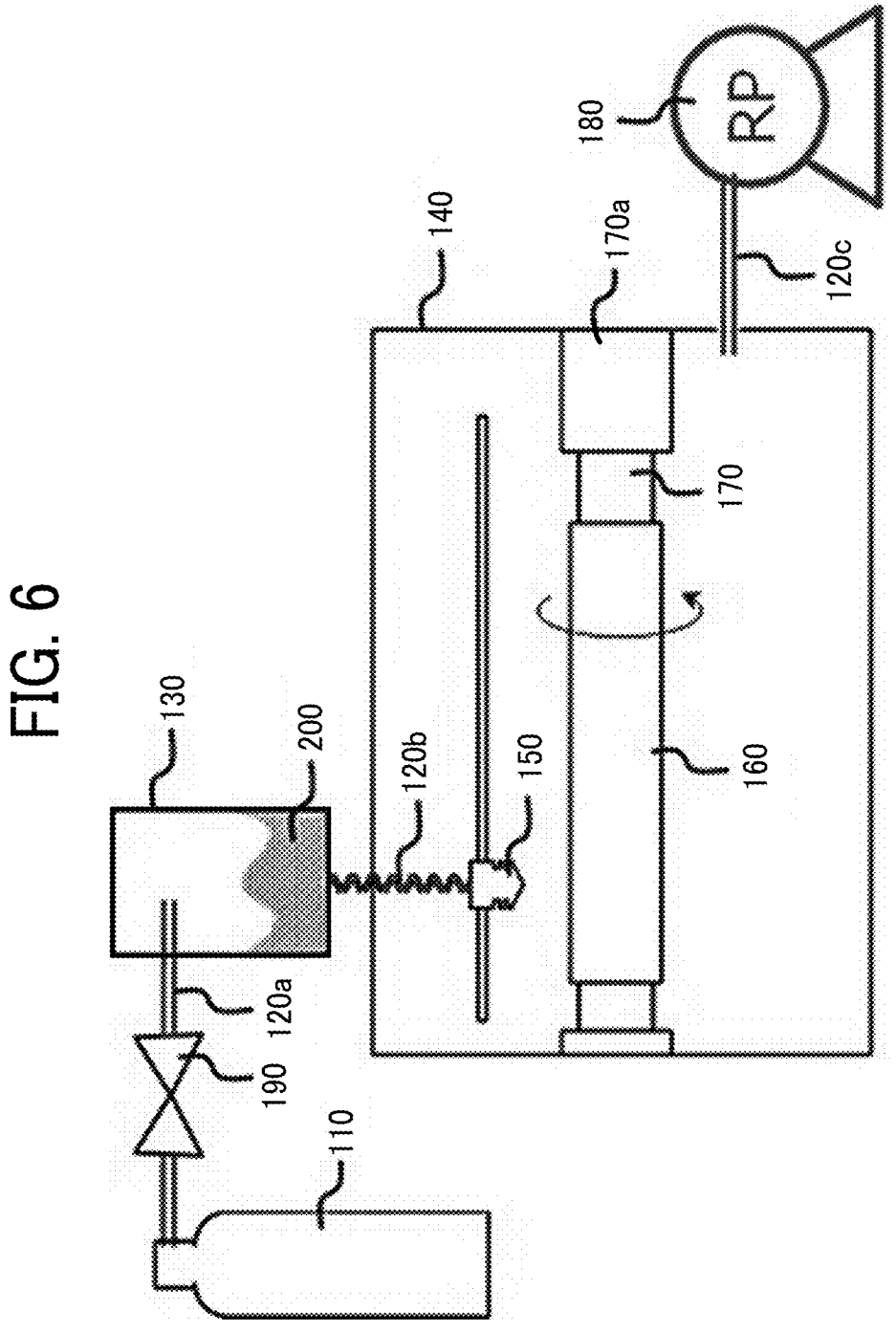
FIG. 6 is a conceptual configuration diagram depicting an aerosol deposition device used for producing the stack according to an embodiment of the present invention.

In this case, an aerosol deposition device illustrated in FIG. 6 is used. A gas cylinder 110 illustrated in FIG. 6 stores an inert gas for generating an aerosol. The gas cylinder 110 is coupled to an aerosol generator 130 via a pipe 120a, and the pipe 120a is drawn into the aerosol generator 130. A certain amount of alumina powder 200 is charged into the aerosol generator 130. Another pipe 120b joined to the aerosol generator 130 is coupled to a spraying nozzle 150 inside a film formation chamber 140.

In the present embodiment, the alumina powder 200 may be charged into the aerosol generator 130, to generate an aerosol, that is guided to the spraying nozzle 150 through the pipe 120b.

Inside the film formation chamber 140, a substrate holder 170 holds a substrate 160 so as to face the spraying nozzle 150. Examples of the substrate 160 to be used include, but are not limited to, a cylindrical electronic device such as an organic-material support, an inorganic-material support, a photoconductor, a solar cell, and an EL device. An exhaust pump 180 is coupled to the film formation chamber 140 via a pipe 120c for adjusting the degree of vacuum inside the film formation chamber 140.

In addition, the aerosol deposition device in the present embodiment includes a mechanism for moving the spraying nozzle 150 in a lateral direction at a constant speed while rotating the substrate holder 170 with a rotator 170a. A film is formed with the spraying nozzle 150 moving in a lateral direction, thereby allowing formation of an alumina layer having a desired area on the substrate 160.

In the process of forming the alumina layer, first, a pneumatic valve 190 is closed, and the exhaust pump 180 evacuates the film formation chamber 140 and the aerosol generator 130. Next, the pneumatic valve 190 is opened to introduce the gas in the gas cylinder 110 into the aerosol generator 130 through the pipe 120a and sprinkle the alumina powder 200 inside the container, thereby generating an aerosol in which the alumina powders 200 are dispersed in the gas. The generated aerosol is sprayed at a high speed from the nozzle 150 to the substrate 160 through the pipe 120b. After 0.5 seconds have elapsed with the pneumatic valve 190 being opened, the pneumatic valve 190 is closed for the next 0.5 seconds. After that, the pneumatic valve 190 is opened again, and then repeatedly closed and opened at a cycle of 0.5 seconds. The flow rate of gas from the gas cylinder 110 is 5 liter/minute; the film formation time is 1 hour; the degree of vacuum in the film formation chamber 140 with the pneumatic valve 190 being closed is about 10 Pa; and the degree of vacuum in the film formation chamber 140 with the pneumatic valve 190 being opened is about 100 Pa.

The spraying speed of the aerosol is controlled by the shape of the spraying nozzle 150, the length and inner diameter of the pipe 120b, the gas internal pressure of the gas cylinder 110, the exhaust amount of the exhaust pump 180 (internal pressure of the film formation chamber 140), or another parameter. For example, provided that the internal pressure of the aerosol generator 130 is set to several tens of thousands of Pa, and that the internal pressure of the film formation chamber 140 is set to several tens to several hundreds of Pa, and that the shape of the opening of the spraying nozzle 150 is set to a circular shape with an inner diameter of 1 mm, the spraying speed of the aerosol can be set to several hundreds of m/sec owing to the difference in internal pressure between the aerosol generator 130 and the film formation chamber 140. With maintenance of the internal pressure of the film formation chamber 140 at 5 Pa to 100 Pa and the internal pressure of the aerosol generator 130 at 50,000 Pa, a metal oxide layer having a pore ratio of 5% to 30% can be formed. Preferably, adjustment of the time for supplying the aerosol under this condition leads to adjustment of the mean thickness of the alumina layer to 0.1 μm to 10 μm.

The mean thickness of the alumina layer can be set to an appropriate thickness corresponding to each application.

The alumina powder 200 in the aerosol that have been accelerated and gained kinetic energy collides with the substrate 160 and is finely crushed by impact energy. Joining of these crushed particles to the substrate 160 and joining the crushed particles to each other causes serial formation of alumina layers on a substrate.

Film formation is performed by a plurality of line patterns and rotation of the support. An alumina layer having a desired area is formed, while the substrate (drum) holder 170, the spraying nozzle 150, and another parts is made to scan in a longitudinal direction and a lateral direction on the surface of the substrate 160.

<Other Process>

The other process is not particularly limited, and can be appropriately selected corresponding to a purpose.

EXAMPLES

Hereinafter, the present embodiment will be further described by way of examples, but the present embodiment is not limited to the following examples. In the following descriptions, "parts" represents "parts by mass" unless otherwise specified.

—Preparation of Alumina Powder—

—Preparation of Row Material Particles—

Using a dry disperser (DRYSTER SDA1, manufactured by Ashizawa Finetech Ltd.), each of alumina 1 (SUMICO-RUNDUM AA-07, D50 particle diameter: 0.9 μm, manufactured by Sumitomo Chemical Co., Ltd.) and alumina 2 (SUMICORUNDUM AA-18, D50 particle diameter: 20 μm, manufactured by Sumitomo Chemical Co., Ltd.) is separately subjected to dispersion under the following conditions.

—Dispersion Conditions—

Dry disperser: DRYSTER SDA1 (manufactured by Ashizawa Finetech Ltd.)

Dispersion medium: PSZ (partial stabilized zirconia) ball (manufactured by Nikkato Corporation, 3 mm in diameter)

Filling content of a dispersion medium: 2.5 kg

Circumferential velocity: 4 m/s

Feed (supply); 1 kg/h

Opening: 1.5 mm

Dispersion auxiliary: 100% ethanol (1% by mass relative to total dispersion mass)

Dispersion time: 120 minutes

After dispersion, a dispersion auxiliary contained in recovered powder was removed by heat-drying at 180° C. for 3 hours.

After the dispersion described above, alumina 1 is referred to as AA-07 #1, and alumina 2 is referred to as AA-18 #1.

—Preparation of Alumina Powder 1 (Mixture 1)—

To a 2 L plastic container, 100 mass parts of AA-07 #1, 600 mass parts of AA-18 #1, and 400 mass parts of alumina 3 (SUMICORUNDUM AA-1.5, D50 particle diameter: 1.7 μm, manufactured by Sumitomo Chemical Co., Ltd.) were charged at the ratio described in Table 1, and mixed and stirred for 10 minutes by a TURBULA mixer (manufactured by Willy A. Bachofen (WAB) AG) to provide alumina powder 1 (mixture 1). SUMICORUNDUM AA-1.5 was directly used as a raw material.

The particle size distribution of alumina powder 1 thus obtained was measured under the following conditions. The results are summarized in FIG. 2A and Table 1.

[Measurement Conditions of Particle Size Distribution]

Particle size distribution measurement device with a laser diffraction/scattering system: MT3300EX 11 (manufactured by MicrotracBEL Corp.)

Measurement system: dry

Pressure of pressure air used for dispersion of a sample in measurement: 0.15 MPa Temperature/humidity environment in measurement: 23±1° C., 50±3% RH

Example 1

The powder derived from mixture 1 as a raw material was blew to the surface of a substrate (polyester film, LUMIRROR 75T60, manufactured by Toray Industries, Inc.) by aerosol deposition (AD).

In particular, the substrate was affixed to the surface of an aluminum tube having a diameter of φ100 mm and a length of 380 mm (manufactured by Nikkeikin Aluminium Core Technology Company, Ltd.) and used as a substrate support for AD.

A slit nozzle was placed above the aluminum tube, and moved from side to side in a longitudinal direction of the aluminum tube with blowing out alumina powder 1 (mixture 1) onto the surface of the substrate under the conditions as below.

The speed of moving the slit nozzle from side to side was fixed as an application speed, and the aluminum tube was rotated at a predetermined speed during aerosol deposition.

—Spraying (Film Formation) Conditions—

Raw material: mixture 1

Water content of a mixture: 0.2% or less (as a measured value by a Karl Fischer moisture meter)

Dew point temperature in charging of metal oxide particles in a container: −53° C.

Aerosolizing gas species: dry air

Aerosolizing gas flow rate: 8 L/min (in total)

Vacuum degree in a film formation chamber: 70 Pa

Slit shape of a powder discharging part of a nozzle: a rectangular shape having a width of 1 mm and a length of 10 mm Nozzle angle: 75°

Distance between a slit nozzle and a substrate: 20 mm

Application speed: 20 mm/min

Rotation speed of an aluminum tube: 20 rpm

Number of applications: 6 times (3 rounds)

Herein a nozzle angle represents an angle for positioning a slit nozzle relative to a migration direction of a nozzle.

Figure 5:
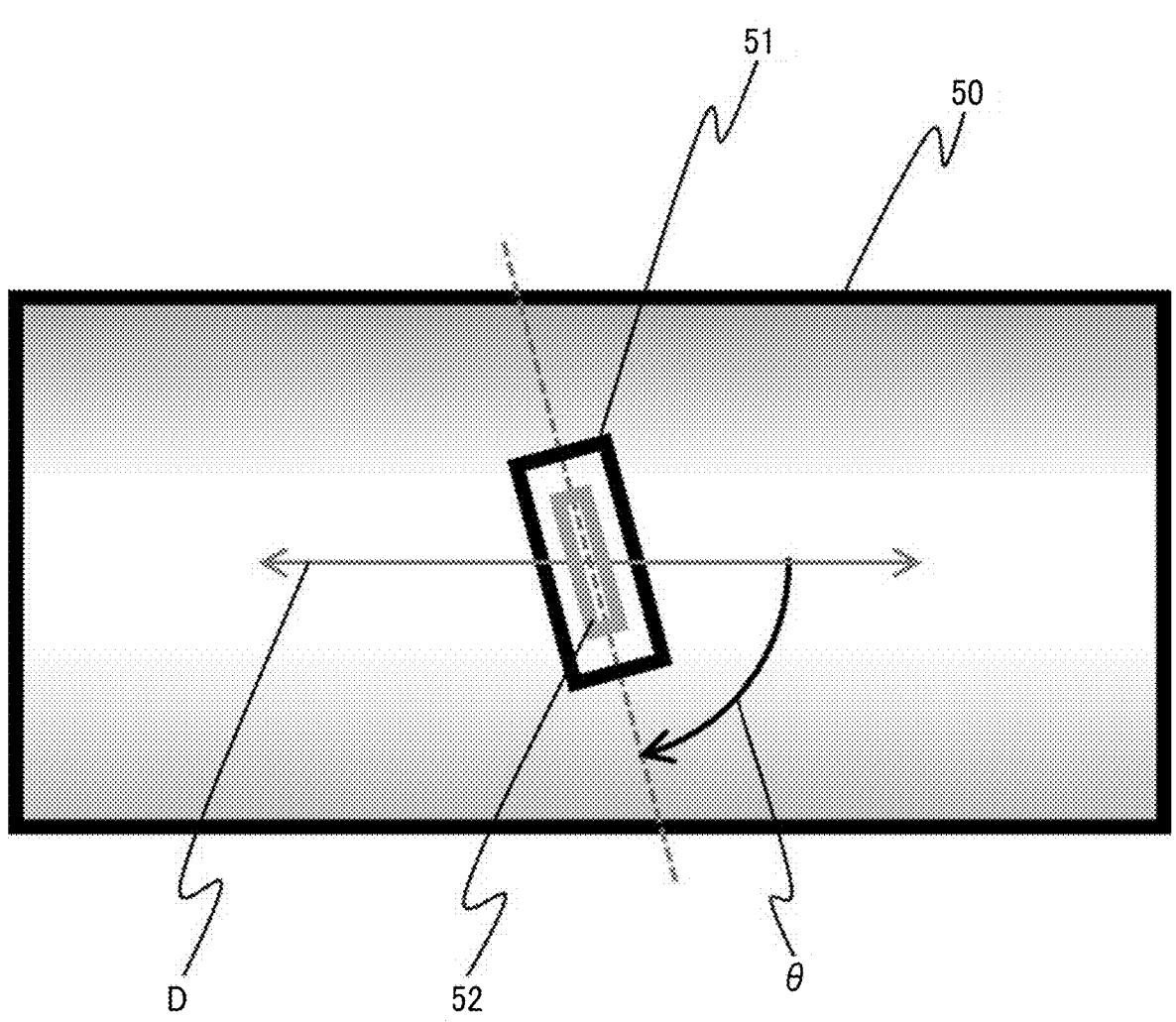
FIG. 5 is a conceptual configuration diagram depicting a powder spraying device used for a method of producing the stack according to an embodiment of the present invention.

FIG. 5 depicts a conceptual diagram thereof. FIG. 5 is a conceptual diagram depicting a powder spraying device used in a production method of the stack according to the present embodiment. FIG. 5 depicts a conceptual diagram of a slit nozzle 51 disposed above an aluminum tube 50 as seen from above.

As depicted in FIG. 5, a nozzle angle θ refers to an inclination of a slit 52 in the slit nozzle 51 relative to a migration direction D of the slit nozzle 51 moving from side to side as a base axis.

In this manner, film 1 was provided. In film 1, the mean thickness of an alumina layer was 0.5 μm, and the arithmetic mean roughness Ra of a boundary line between the substrate and the alumina layer was 0.18 μm.

The mean thickness of the alumina layer was derived by setting a straight line L that has contact with but not intersects a boundary line and is parallel to a straight line in the bottom face of the substrate, in a cross-sectional view perpendicular to a planar view of the substrate; and performing 10-point measurement for a distance from the straight line L to the outermost surface of the alumina layer perpendicular to the straight line L at any 10 points on the straight line L.

The arithmetic mean roughness Ra was measured and calculated as follows.

First, a stack including an alumina layer directly on the substrate was subject to focused ion beam (FIB) processing in a direction perpendicular to a planar view of the substrate, thereby obtaining a cross-sectional sample for electron microscopy that enables observation of a layer structure of the stack as depicted in FIG. 3.

The level of unevenness of a boundary line (interface) between the substrate and the alumina layer was measured and calculated by observing the cross-sectional sample.

Ultra-low-accelerated field emission scanning electron microscope (device name: Gemini SEM 300, manufactured by Carl Zeiss Co., Ltd.) was used to take image data, such as a SEM image or a STEM image, of the observation sample under a condition of an acceleration voltage of 2 kV or less.

Next, the alumina layer and the boundary line between the alumina layer and the substrate were defined by image analysis of a SEM-EDS image by use of an ultra-low-accelerated field emission scanning electron microscope.

An ultra-low-accelerated field emission scanning electron microscope mounted with an EDS detector (device name: Gemini SEM 300, manufactured by Carl Zeiss Co., Ltd.) was used. Irradiation energy of an electron beam in acquisition of a SEM image was $3.0×10^{-7}$ J/S. EDS measurement was performed with electron beam irradiation energy identical to that in the SEM image thus obtained, thereby providing an image color-coded for an alumina-originated element (e.g., aluminum), a substrate-originated element (e.g., carbon), and other elements (hereinafter referred to as a SEM-EDS image).

In this image data, for the purpose of emphasizing the level of unevenness of a boundary line (interface) between the substrate and the alumina layer, binarization of the image data or extraction of an edge was performed to highlight the boundary line, followed by digitization of the contour as a two-dimensional numerical value data. These processing employed image analysis software ImageJ (NIH).

Furthermore, a waveform of the boundary line was output as a function of a measurement waveform by image analysis software ImageJ (NIH), and calculation was performed according to a calculation formula of an arithmetic mean roughness (Ra) represented by Formula 1 as follows:

$$Ra = \frac{1}{L} \int_0^L |f(x)| dx \qquad \text{Formula 1}$$

wherein in Formula 1, L represents a whole measurement length and is 8 μm or more to 16 μm or less, x represents a measurement position, and f(x) represents a function of a measurement waveform.

In addition, L was 14 μm in Example 1.

Example 2

In Example 1, film 2 was obtained in the same manner as in Example 1, except for changing a substrate used to an acrylic film (trade name: TECHNOLLOY S001G, 188 μm in mean thickness, available from Sumika Acryl Co., Ltd.) In film 2, the mean thickness of an alumina layer was 0.8 μm, and the arithmetic mean roughness Ra of a boundary line between the substrate and the alumina layer was 0.14 μm.

Example 3

In Example 1, before spraying of alumina powder, an intermediate layer-forming liquid having the composition described below was applied onto the surface of a substrate by a doctor blade, and then subjected to heat-drying, thereby forming an intermediate layer having a thickness of 5 μm on the surface of the substrate. Subsequently, film 3 was obtained in the same manner as in Example 1, except for forming an alumina layer by AD with change of the spraying conditions of alumina powder in Example 1 to the conditions described below. In film 3, the mean thickness of an alumina layer was 1.3 μm, and the arithmetic mean roughness Ra of a boundary line between the substrate and the alumina layer was 0.08 μm.
[Intermediate Layer Forming Liquid]
  Silsesquioxane (COMPOCELAN SQ107, manufactured by Arakawa Chemical Industries, Ltd.): 100 mass parts
  Isocyanate (CORONATE HX, manufactured by Tosoh Corporation): 61 mass parts Catalyst (U-CAT SA102, manufactured by San-Apro Ltd.): 0.13 mass parts
  Ethylene glycol dimethyl ether (manufactured by FUJI-FILM Wako Pure Chemical Corporation): 359 mass parts
[Supply Conditions of Intermediate Layer-Forming Liquid]
  A doctor blade (YD type, manufactured by Mitutoyo Corporation) was used to sweep a paint, thereby supplying an intermediate layer-forming liquid to form a film.
  A space between the substrate and the doctor blade in sweeping was 50 μm.
[Heat-Drying Conditions for Intermediate Layer]
  After heat-drying at a temperature of 75° C. for 20 minutes, heat-drying was performed at a temperature of 120° C. for 20 minutes.
  —Spraying (Film Formation) Conditions—
  Flow rate of aerosolizing gas: 5 L/min (in total)
  Vacuum degree in a film formation chamber: 50 Pa
  Nozzle angle: 80°
  Additionally, in Example 3, an intermediate layer formed on the substrate was subjected to a pencil hardness test in accordance with JIS K 5600-5-4:1999, which uses a pencil having a concentration of 2H (UNI pencil for pencil hardness test, manufactured by Mitsubishi Pencil Co., Ltd.) In the pencil hardness test, a surface texture tester TYPE: 38 (manufactured by Shinto Scientific Co., Ltd.) mounted with a holder for a pencil hardness test was used as a tester. The surface of the intermediate layer was scratched with a pencil lead throughout a length of 10 mm at a speed of 60 mm/min under an environment of 23° C. and 50%. Observation of the scratched site using a confocal microscope OPTELICS H-1200 (manufactured by Lasertec Corporation) revealed no cohesion failure in the coated film.

Example 4

Film 4 was obtained in the same manner as in Example 3, except for changing alumina powder 1 in Example 3 to alumina powder 2 (100 mass parts of AA-07 #1, 200 mass parts of AA-18 #1, and 133 mass parts of SUMICORUNDUM AA-1.5). In film 4, the mean thickness of an alumina layer was 1.3 μm, and the arithmetic mean roughness Ra of a boundary line between a substrate and an alumina layer was 0.09 μm.

The particle size distribution of alumina powder 2 was measured under the same conditions as that of alumina powder 1. The results are summarized in FIG. 2B and Table 1.

Example 5

Film 5 was obtained in the same manner as in Example 3, except for changing the composition of the intermediate layer-forming liquid in Example 3 to the composition described below. In film 5, the mean thickness of an alumina layer was 3.0 μm, and the arithmetic mean roughness Ra of a boundary line between a substrate and an alumina layer was 0.08 μm.
[Intermediate Layer Forming Liquid]
  Silicone hard coating paint (NSC-5506, manufactured by Nippon Fine Chemical Co., Ltd.): 380 mass parts
  Trimethylethoxysilane (manufactured by Tokyo Chemical Industry Co., Ltd.): 20 mass parts
  Tetrahydrofuran (manufactured by Mitsubishi Chemical Corporation): 1556 mass parts
  Cyclopentanone (manufactured by Kanto Chemical Co., Ltd.): 444 mass parts Additionally, an intermediate layer formed on the substrate was subjected to a pencil hardness test in accordance with JIS K 5600-5-4:1999, which uses a pencil having a concentration of 2H (UNI pencil for pencil hardness test, manufactured by Mitsubishi Pencil Co., Ltd.) in the same manner as that in Example 3. Observation of the scratched site using a confocal microscope OPTELICS H-1200 (manufactured by Lasertec Corporation) revealed a cohesion failure generated in the coated film.

Comparative Example 1

Film 6 was obtained in the same manner as in Example 3, except for changing alumina powder 1 in Example 3 to alumina powder 3 (100 mass parts of AA-07 #1, 67 mass parts of AA-18 #1, and 44 mass parts of SUMICORUNDUM AA-1.5). In film 6, the mean thickness of an alumina layer was 0.01 µm. Due to failure in determination of a part of a boundary line between a substrate and the alumina layer, the arithmetic mean roughness Ra could not be calculated.

The particle size distribution of alumina powder 3 was measured in the same manner as that of alumina powder 1. The results are summarized in FIG. 2C and Table 1.

Comparative Example 2

Film 7 was obtained in the same manner as in Example 3, except for changing alumina powder 1 in Example 3 to alumina powder 4 (SUMICORUNDUM AA-07, manufactured by Sumitomo Chemical Co., Ltd.). In film 7, the mean thickness of an alumina layer was less than 0.01 µm. Due to failure in determination of a part of a boundary line between a substrate and the alumina layer, the arithmetic mean roughness Ra could not be calculated.

Figure 2D:
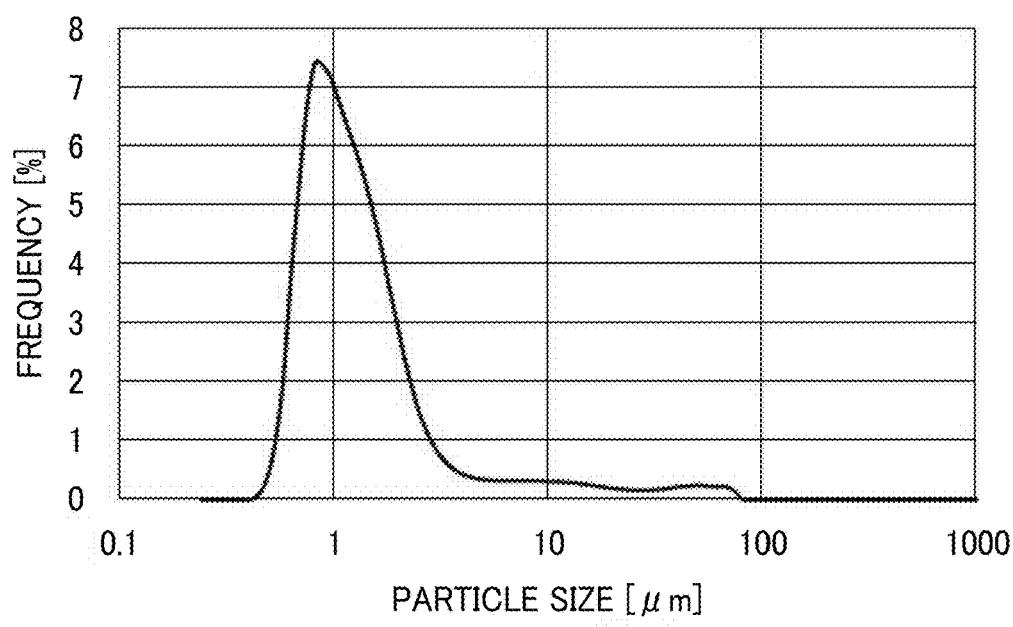
FIG. 2D is a graph illustrating a particle size distribution of another alumina powder in Comparative Example 2.

The particle size distribution of alumina powder 4 was measured in the same manner as that of alumina powder 1. The results are summarized in FIG. 2D.

Comparative Example 3

Film 8 was obtained in the same manner as in Example 3, except for not performing a powder spraying process of alumina powder in Example 3. Since film 8 did not form an alumina layer, the mean thickness of an alumina layer was not measurable, and the arithmetic mean roughness Ra could not be calculated.

TABLE 1

| Alumina powder (mixture) | AA-07#1 [mass parts] | AA-1.5 [mass parts] | AA-18#1 [mass parts] |
|---|---|---|---|
| alumina powder 1 (mixture 1) | 100 | 400 | 600 |
| alumina powder 2 (mixture 2) | 100 | 133 | 200 |
| alumina powder 3 (mixture 3) | 100 | 44 | 67 |

TABLE 2

| Material of alumina layer | Peak height $T_A$ of peak A | Peak height $T_B$ of peak B | Peak height $T_C$ of peak C | Mean Tx of 3 peak heights | 0.7Tx | 1.3Tx |
|---|---|---|---|---|---|---|
| alumina powder 1 | 2.6 (−26%) | 3.6 (+3%) | 4.2 (+20%) | 3.5 | 2.45 | 4.55 |
| alumina powder 2 | 5.0 (+24%) | 2.9 (−26%) | 3.6 (−8%) | 3.9 | 2.73 | 5.07 |
| alumina powder 3 | 8.1 (−84%) | 2.9 (−34%) | 2.3 (−48%) | 4.4 | 3.08 | 5.72 |
| alumina powder 4 | 7.4 | — | — | — | — | — |

In Table 2, numerical values in parentheses represent proportions relative to a mean value $T_X$ of 3 peak heights.

In the example, identification of a peak in a particle size distribution was performed using instrumentation software accompanying a particle size distribution measurement device (dms2, manufactured by MicrotracBEL Corp.).

Next, films 1-8 thus obtained were measured and evaluated for "pencil hardness test" and "total light transmittance" as described below. The results are summarized in Table 3.

—Pencil Hardness Test—

The test was performed with a surface texture tester TYPE: 38 (manufactured by Shinto Scientific Co., Ltd.) in accordance with JIS-K5600-5-4:1999. The load for the test was 750 gf. The grade of 4H or more indicates available for actual use.

—Total Light Transmittance (%)—

The total light transmittance (%) of a film was measured using an ultraviolet-visible near-infrared spectrophotometer UV-3600 (manufactured by Shimadzu Corporation) mounted with an integrating sphere sample stand set. The value of 85% or more indicates available for actual use.

TABLE 3

| | | Base material | Presence of intermediate layer | Raw material | Mean thickness (µm) | Ra (µm) | Pencil hardness | Total light transmittance |
|---|---|---|---|---|---|---|---|---|
| Example | 1 | polyester film | No | alumina powder 1 | 0.5 | 0.18 | 5H | 85% |
| | 2 | acrylic film | No | alumina powder 1 | 0.8 | 0.14 | 5H | 85% |

TABLE 3-continued

| | | | Alumina layer | | | | |
| | Base material | Presence of intermediate layer | Raw material | Mean thickness (µm) | Ra (µm) | Pencil hardness | Total light transmittance |
|---|---|---|---|---|---|---|---|
| | 3 polyester film | Yes | alumina powder 1 | 1.3 | 0.08 | 5H | 89% |
| | 4 polyester film | Yes | alumina powder 2 | 1.3 | 0.09 | 5H | 87% |
| | 5 polyester film | Yes | alumina powder 1 | 3 | 0.08 | 4H | 89% |
| Comparative Example | 1 polyester film | Yes | alumina powder 3 | 0.01 | — | H | 90% |
| | 2 polyester film | Yes | alumina powder 4 | less than 0.01 | — | 2H | 84% |

The results of the examples demonstrates that the alumina powder according to the present embodiment allowed ceramic coating by AD with ease, and provided a film thus obtained with an alumina layer (film) having high strength without impairing transparency of a substrate.

Moreover, inclusion of an intermediate layer allowed prevention of whitening of a substrate and improvement in total light transmittance.

The films in Comparative Examples 1 and 2 were not concluded to form an alumina layer, and the alumina layers thus obtained had low strength.

Examples of aspects according to the present embodiment include the following.

<1> An alumina powder satisfying the following expressions:

$$0.7T_X \leq T_A \leq 1.3T_X;$$ (Expression 1)

$$0.7T_X \leq T_B \leq 1.3T_X; \text{ and}$$ (Expression 2)

$$0.7T_X \leq T_C \leq 1.3T_X,$$ (Expression 3)

where $T_X$ represents a mean value of a peak height $T_A$ of a peak A in a particle size distribution of 0.3 µm or more to less than 1.2 µm, a peak height $T_B$ of a peak B in a particle size distribution of 0.7 µm or more to less than 3 µm, and a peak height $T_C$ of a peak C in a particle size distribution of 3 µm or more to less than 20 µm.

<2> The alumina powder according to the item <1>, wherein the alumina powder comprises α-alumina having a crystal structure represented by a hexagonal closest packing structure, and a content of the α-alumina is 34% by mass or more.

<3> A stack including a substrate and an alumina layer containing the alumina powder according to the item <1> or <2>, wherein, in a cross-sectional view perpendicular to a planar view of the substrate, a surface of the alumina layer which faces the substrate has an arithmetic mean roughness Ra of 0.08 µm or more to 0.20 µm or less, where the arithmetic mean roughness Ra is represented by the following Formula 1:

$$Ra = \frac{1}{L} \int_0^L |f(x)| dx$$ (Formula 1)

where in Formula 1, L represents a whole measurement length and is 8 µm or more to 16 µm or less, x represents a measurement position, and f(x) represents a function of a measurement waveform.

<4> The stack according to the item <3>, wherein, in the cross-sectional view perpendicular to the planar view of the substrate, the stack has an anchor region in which a material of the alumina layer and the substrate are mixed.

<5> A stack including a substrate, an alumina layer containing the alumina powder according to the item <1> or <2>, an intermediate layer between the substrate and the alumina layer, and an anchor region between the alumina layer and the intermediate layer, in which the alumina layer and the intermediate layer are mixed.

<6> The stack according to the item <5>, wherein the intermediate layer has 2H or harder in pencil hardness not causing cohesion failure, in regard to pencil hardness measured in accordance with JIS K 5600-5-4:1999.

<7> A method of producing the alumina powder according to any of the items <1> to <2>, including performing dry dispersion of first alumina particles having a volume mean particle diameter of 0.5 µm or more to 0.9 µm or less and second alumina particles having a volume mean particle diameter of 10 µm or more to 20 µm or less.

<8> A method of producing a stack, including spraying, from a nozzle to a substrate, the alumina powder according to the item <1>.

The alumina powder according to any of the items <1> to <2>, the stack according to any of the items <3> to <6>, the production method of the alumina powder according to the item <7>, and the production method of the stack according to the item <8> can solve the various conventional problems described above, and achieve a purpose in the present embodiment.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The invention claimed is:

1. A stack comprising:

a substrate; and an alumina layer containing an alumina powder satisfying the following expressions: 5

$$0.7T_X \leq T_A \leq 1.3T_X;$$ (Expression 1)

$$0.7T_X \leq T_B \leq 1.3T_X;$$ (Expression 2)

10 and $$0.7T_X \leq T_C \leq 1.3T_X,$$ (Expression 3)

where $T_X$ represents a mean value of a peak height $T_A$ of a peak A in a particle size distribution of 0.3 μm or more 15 to less than 1.2 μm, a peak height $T_B$ of a peak B in a particle size distribution of 0.7 μm or more to less than 3 μm, and a peak height $T_C$ of a peak C in a particle size distribution of 3 μm or more to less than 20 μm, wherein the alumina powder comprises α-alumina having 20 a crystal structure represented by a hexagonal closest packing structure, and a content of the α-alumina is 34% by mass or more, and wherein peak height $T_A$ or peak height $T_C$ is the largest 25 among the peak heights $T_A$, $T_B$, and $T_C$ wherein, in a cross-sectional view perpendicular to a planar view of the substrate, a surface of the alumina layer which faces the substrate has an arithmetic mean roughness Ra of 0.08 μm or more to 0.20 μm or less, 30 where the arithmetic mean roughness Ra is represented by the following Formula 1:

$$Ra = \frac{1}{L}\int_0^L |f(x)|dx$$ Formula 1 where in Formula 1, L represents a whole measurement length and is 8 μm or more to 16 μm or less, x represents a measurement position, and f (x) represents a function of a measurement waveform, wherein the alumina powder comprises α-alumina having a crystal structure represented by a hexagonal closest packing structure, and a content of the α-alumina is 34% by mass or more, and wherein the substrate is a plastic film.

2. The stack according to claim 1, wherein, in the cross-sectional view perpendicular to the planar view of the substrate, the stack has an anchor region in which a material of the alumina layer and the substrate are mixed.

3. The stack according to claim 2, wherein the anchor region includes an organic-inorganic hybrid material having a siloxane bond.

4. The stack according to claim 1, further comprising:

an intermediate layer between the substrate and the alumina layer, and an anchor region between the alumina layer and the intermediate layer, in which the alumina layer and the intermediate layer are mixed.

5. The stack according to claim 4, wherein the intermediate layer has 2H or harder in pencil hardness not causing cohesion failure, in regard to pencil hardness measured in accordance with JIS K 5600 May 4:1999.

* * * * *